Patented Nov. 27, 1928.

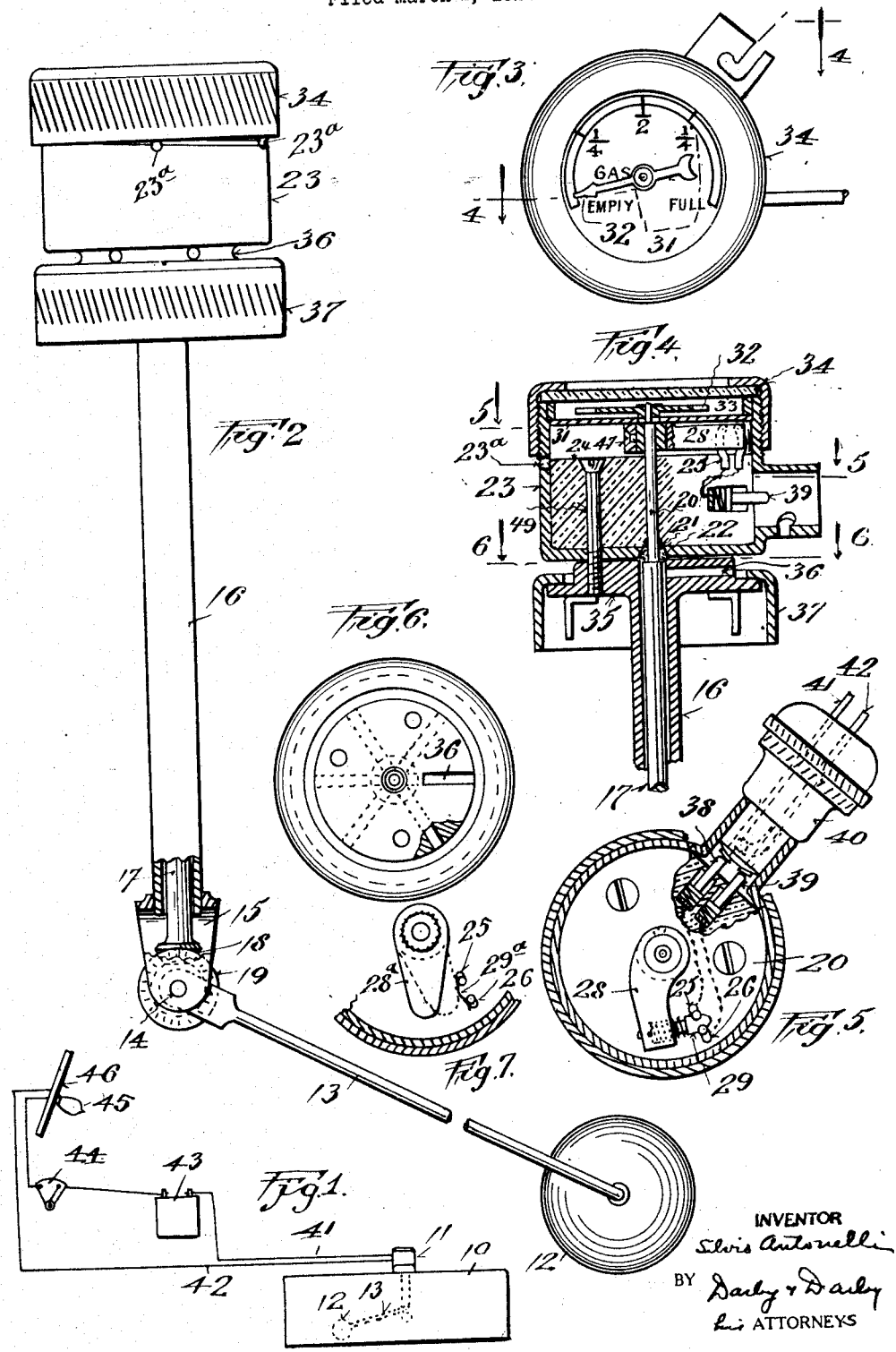

1,693,131

UNITED STATES PATENT OFFICE.

SILVIO ANTONELLI, OF NEW HAVEN, CONNECTICUT.

SIGNAL SWITCH FOR TANKS.

Application filed March 1, 1924. Serial No. 696,144.

This invention relates to improvements in a signal device which is designed to indicate that the gasoline supply in the tank has become exhausted, or is nearly exhausted.

A further object includes the provision of a signal as an electric lamp which will become illuminated when the supply of gasoline is nearly or entirely exhausted.

Another object includes the provision of mechanism for indicator devices which is electrically operated and is readily attached to the standard gasoline gauge of an automobile gasoline tank.

A still further object includes the provision of safety mechanism whereby all danger of electric ignition and explosion is eliminated.

Other objects will appear hereinafter, and I attain these objects by the device illustrated in the accompanying drawing in which:

Figure 1 is an elevation, largely diagrammatic, of a construction embodying my invention.

Fig. 2 is an elevation of a gasoline gauge to which my invention is applied.

Fig. 3 is a face view thereof.

Fig. 4 is a view taken on line 4—4 of Fig. 3,

Fig. 5 is a view taken on line 5—5 of Fig. 4.

Fig. 6 is a view taken on line 6—6 of Fig. 4.

Fig. 7 is a view of a simple contact closer.

Like numerals refer to similar parts throughout the several views.

It has heretofore been proposed to provide devices which indicate the level of gasoline in tanks and to provide said devices with electrical attachments for showing at points remote, the state of the gasoline in said tanks. But in all electric devices for gasoline tanks generally, and for those on automobiles specifically, the danger of electric ignition is recognized. It is one of the prime purposes of my invention to provide an electrical indicator attachment in which the danger noted above has been eliminated, and which is cheap in construction and may be readily attached to the standard gasoline barrel of gasoline tanks for automobiles.

In general the electric attachment which I employ includes means for closing an electric circuit under certain conditions and whereby a proper signal, usually on the dash board of an automobile or in the front of the driver, is rendered effective. The electric circuit, while closed by the float which is located within the tank, in no wise includes the tank itself or any part thereof, but is totally isolated from the tank or its gauge and gauge barrel. I have provided means, however, whereby the float of a gasoline gauge closes an independent and isolated electric circuit, to illuminate a signal lamp at any time when the liquid has reached a predetermined level in the tank.

In a preferred form of construction, to which, however, I do not desire to limit myself, the usual gasoline tank 10 is provided with a gauge 11, which is operated by a float 12. This float is supported on an arm 13, and the arm is pivotally mounted on a pivot pin 14 in a bracket 15. This bracket is secured to the end of a hollow gauge stem 16, within which operates the drive shaft 17. One end of this shaft is supplied with a pinion head 18, the beveled gears of which mesh with a companion beveled pinion 19 on the pivot end of arm 13 to be rotated thereby as the float moves up and down with the state of gasoline supply. On the reduced part 20 of shaft 17 there is fitted a suitable packing 21. This packing is held within a recess 22 and prevents gasoline from creeping up into cap 23 and inside of the insulation base 24, in which contact points 25 and 26 are located. Immediately above the insulation block 24 on the reduced part of the shaft 17 is attached the circuit closing arm 28. This arm consists of insulating material and carries a spring seated circuit closer 29 for closing the circuit between contacts 25 and 26. An index plate 31 in the upper part of cap 23 forms the contact chamber above block 24, and an index hand 32 on the end of the shaft 47 shows the level of the gasoline in the tank. The usual glass 33 and cap 34 protect and enclose the gauge, and the entire assembly is mounted on head 35 of the hollow gauge stem 16. Any suitable means, as a screw 49, secures the insulation block and associated parts to the stem head 35. This head is further also provided with a number of radially placed bores 36 for permitting dissipation of any gasoline that may accumulate within the upper end of stem 16. A cap 37 engages head 35 and holds the entire device in place on the tank to which my improved signal device is applied. This construction also provides means by which said device is readily placed on standard gasoline or other tanks wherein it is important, or desirable, to give notice of the liquid level within said tank. This notice may be of any suitable signal, visual or audible, and in my preferred construction for auto vehicles I prefer a visual device as a signal light to flash up when the gasoline supply has reached a predetermined low level. When this condition obtains the signaling circuit is automatically closed by the circuit closing arm 28 with its circuit closer 29 being moved to engage contact points 25 and 26 of the signaling circuit. As is best shown by Figs. 4 and 5, these contacts project from the upper surface of the insulation body 24 into the contact chamber and are electrically connected with socket contacts 38 and 39 for engaging the corresponding plug contacts of plug 40. This plug in turn carries the conductors 41 and 42 of the signaling circuit. The circuit is provided with a battery 43, a switch 44 and the signal lamp or device 45. This device is preferably carried on the dash 46 in plain view of the operator or driver.

In Fig. 7 I have shown the circuit closing arm or cam $28^a$ without a spring seated closer thereon. But in this construction I provide a stationary circuit closing contact spring $29^a$ which is carried by one of the contact terminals, preferably by terminal 26. Normally spring $29^a$ does not engage its companion terminal, e. g. 25, (if the spring is carried by terminal 26 or the reverse, if carried by terminal 25), but when cam $28^a$ assumes the position shown in dotted lines then spring $29^a$ is depressed to close the circuit and operate the signal device on the dashboard or other suitable place. Thus it will be observed that my improved device operates on a closed circuit which is entirely insulated from and independent of the float system, thereby avoiding any danger of ignition. Furthermore, if any gasoline fumes actually reach the contact chamber above the insulation member 24, such fumes are quickly dissipated on account of the openings $23^a$ in case 23. But by my safety arrangement there is little or no opportunity for gasoline to creep up along stem 17 which fits extension 16 very closely and is further positively protected by packing 22 and escape vents 36.

The operation of my indicator and signal lamp will be readily understood. The circuit closing arm 28 is properly adjusted and fastened on shaft 17 by suitable means as a set screw 47, so that the circuit closing contact 29 will engage contacts 25 and 26 to close the circuit at the predetermined time and when the liquid in the tank has reached the level, when it is desirable to sound the alarm. When this point is reached the lamp 45 will become illuminated and give the signal. The switch 44 enables driver or operator to open the circuit after having been informed to thus save the battery from useless expenditure of energy.

Having now described my invention, what I claim as new and useful, of my own invention, and desire to secure by Letters Patent is:

1. In a signal device for gasoline tanks, a hollow stem having a head with openings therein radiating from said hollow stem, a rotatable shaft extending through said hollow stem, one end of said shaft extending into the gasoline tank to be immersed at times by the gasoline in said tank, an arm and float operatively connected to said rotatable shaft, an insulation member through which the other end of said shaft passes, conductor terminals carried by said insulation member, means on said stem for protecting said member from gasoline, and means carried by said stem for closing an electric circuit to operate a signal device when the rotatable shaft assumes a predetermined position.

2. In a signal device for gasoline tanks, a hollow stem having a head with openings therein radiating from said hollow stem, a rotatable shaft extending through said hollow stem, one end of said shaft extending into the gasoline tank to be immersed at times by the gasoline in said tank, an insulation member through which the other end of said shaft passes, a securing cap for said head, a holding cap resting on said head, an insulation member in said cap, said cap and insulation member being fastened to said head and having a bore in alignment with the hollow of said stem, a shaft rotatively held in said hollow shaft and extending through said holding cap and insulation member, an arm and float operatively connected to said rotatable shaft, a gasket on said stem to protect the insulation member, a circuit closing member held on said shaft to rotate in a closed chamber, circuit terminals extending into said chamber in the path of the circuit closing member, and means to cause said circuit to close as gasoline in said tank reached a certain level.

In testimony whereof I have hereunto set my hand on this 18th day of February, A. D. 1924.

SILVIO ANTONELLI.